United States Patent
Jackson

(10) Patent No.: US 8,972,563 B2
(45) Date of Patent: Mar. 3, 2015

(54) UPDATING CHANGES TO CACHES

(75) Inventor: Adam D. Jackson, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 507 days.

(21) Appl. No.: 12/957,045

(22) Filed: Nov. 30, 2010

(65) Prior Publication Data

US 2012/0136988 A1 May 31, 2012

(51) Int. Cl.
*G06F 15/173* (2006.01)
*H04L 12/805* (2013.01)

(52) U.S. Cl.
CPC .................................. *H04L 47/365* (2013.01)
USPC ........... 709/224; 709/217; 709/218; 709/202; 709/203

(58) Field of Classification Search
CPC ............ H04L 47/10; H04L 2012/5632; H04L 27/364; H04L 41/145; H04L 65/1016; H04L 65/4061
USPC .......................... 709/224, 217, 218, 202, 203
See application file for complete search history.

(56) References Cited

U.S. PATENT DOCUMENTS

2006/0034248 A1* 2/2006 Mishra et al. ................. 370/349
2006/0177135 A1* 8/2006 Fujita et al. ................... 382/187

OTHER PUBLICATIONS

"Independent Computing Architecture", printed from Internet: http://en.widipedia.org/wiki/Independent_Computing_Architecture on Nov. 30, 2010, 2 pp.
"Lbxproxy (1)", printed from Internet: http://www.xfree86.org/current/lbyproxy.1.html on Nov. 30, 2010, 4 pp.
"TigerVNC, The VNC with teeth", printed from Internet: http://www.tigervnc,com on Nov. 30, 2010, 3 pp.

* cited by examiner

*Primary Examiner* — Lan-Dai T Truong
(74) *Attorney, Agent, or Firm* — Lowenstein Sandler LLP

(57) ABSTRACT

A method and system for optimizing network bandwidth usage in a remote desktop system. A client generates a stream of input events that contain position information of a cursor shown on a display of the client. The client estimates characteristics of a network that couples the client to a server. Based on estimation of the characteristics, the client adjusts the number of input events batched into a packet to be sent from the client to the server over the network.

18 Claims, 5 Drawing Sheets

UPDATING CHANGES TO CACHES

TECHNICAL FIELD

Embodiments of the present invention relate to computer systems, and more specifically, to bandwidth management for a client that interacts with a remote host.

BACKGROUND

A remote desktop allows applications, e.g., drawing or graphics applications, to be run remotely on a server and displayed locally at a client. Information shown on the client's display may be controlled with a pointing device, such as a mouse, a joystick, a touch pad, etc. For example, a user at a client may use a mouse to move a cursor in a display window. The cursor position information is streamed from the client to a server (remote host) via a network. The server processes the cursor position information and sends a response to the client to update the client's display.

The network between the server and the client carries cursor position information between the server and the client. Generally, the cursor position information is itself relatively small, only a few bytes for every position update. Nevertheless, the cursor position information is flushed to the network quite regularly. This regular information transfer introduces significant bandwidth overhead, since the transfer of every new cursor position requires a transport layer packet with a minimum size (e.g., 40 bytes for a transmission control protocol (TCP) packet). Emitting one TCP packet for every position update can be a waste of network bandwidth. Some current systems allow the transmission of the TCP packet be delayed when the network is congested. However, since human eyes are sensitive to lag, low latency is generally desirable in remote desktop systems.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
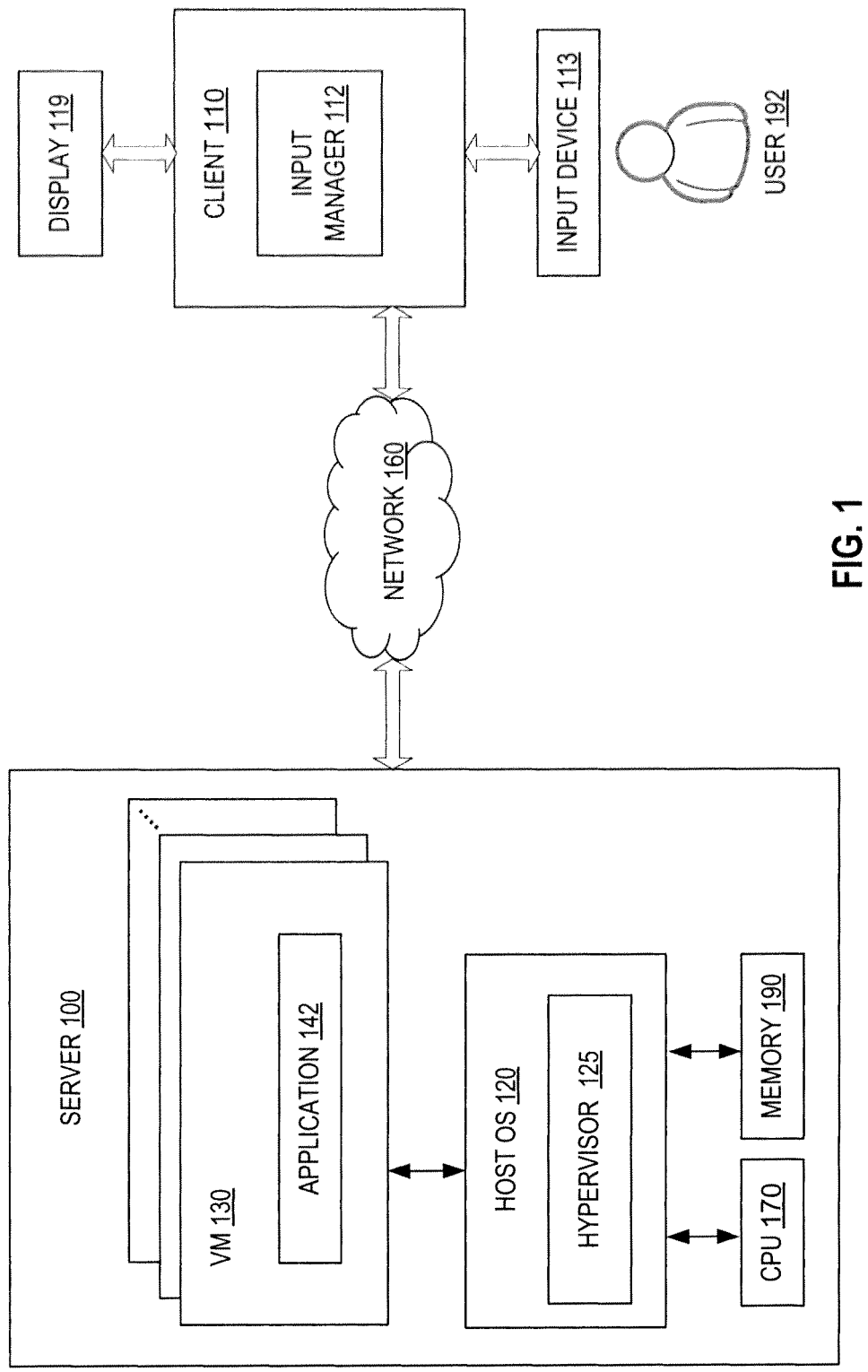
FIG. 1 is a block diagram of a network architecture in which one embodiment of the present invention may operate.

Described herein is a method and system for optimizing network bandwidth usage in a remote desktop system. In one embodiment, a client generates a stream of input events that contain position information of a cursor shown on a display of the client. The client estimates characteristics of a network that couples the client to a server. Based on estimation of the characteristics, the client adjusts the number of input events batched into a packet to be sent from the client to the server over the network.

Embodiments of the present invention provide a remote desktop system in which a server and its remote clients are connected by a network that is subject to traffic fluctuations. In one embodiment, the network may be a wide area network (WAN) that spans across a broad geographical area (e.g., across metropolitan, regional, or national boundaries). In alternative embodiments, the network may include one or more of the following: a private network (e.g., a local area network (LAN), a WAN, intranet, etc.) or a public network (e.g., the Internet). These different networks generally have different network characteristics. For example, WAN usage scenarios for remote desktops typically have a different bandwidth and latency profile than LAN usage scenarios. The network characteristics may also change from time to time due to the real-time traffic fluctuations. The remote desktop system described herein allows a client to monitor the round trip characteristics of a network connection, and batch input events (e.g., cursor position information) that are sent to the server based on the estimated network characteristics. By sending multiple input events in a single packet, the packet overhead is mitigated, which reduces bandwidth usage. The client can also dynamically adjust the batch delay based on the network conditions. Therefore, embodiments of the present invention can optimize bandwidth usage while also limiting the network latency with respect to the responsiveness of the server as perceived by the client.

Embodiments of the present invention are advantageous in low-bandwidth environments. In one embodiment, when the network has a high bandwidth, the client may aggressively send input events to the server to minimize latency. However, when the network has a low bandwidth, reducing the amount of bandwidth consumed by the client can actually improve latency. This is because in a low-bandwidth environment, outgoing packets from the client need to wait for scarce transmission opportunities. When less bandwidth is needed by the client, it is less likely that the outgoing packets will be piling up waiting for those scarce transmission opportunities.

In the following description, numerous details are set forth. It will be apparent, however, to one skilled in the art, that the present invention may be practiced without these specific details. In some instances, well-known structures and devices are shown in block diagram from, rather than in detail, in order to avoid obscuring the present invention.

FIG. 1 is a block diagram that illustrates an embodiment of a network architecture in which embodiments of the present invention may operate. The network architecture includes a server 100 that runs a remote desktop application (e.g., application 142) for a client 110. In the embodiment of FIG. 1, the server 100 runs the application 142 on one of virtual machines (VM) 130 hosted by the server 130. The server 100 may be one or more mainframes, workstations, personal computers (PCs), etc; and the client 110 may be a server computer, a workstation, a personal computer (PC), a mobile phone, a palm-sized computing device, a personal digital assistant (PDA), etc. In one embodiment, the clients 110 may be a thin client, which serves as an access terminal for users and depends primarily on the server 100 for processing activities. For example, the client 110 may run client applications, which forwards input events (e.g., cursor movements generated by a user 192) to the server 100, receives multimedia data streams, graphics, or other data signals from the server 100 and directs the received data to a local display 119 or other user interfaces.

In one embodiment, each virtual machine 130 runs a guest operating system to manage its resources. The virtual machines 130 may run the same or different guest operating systems, such as Microsoft Windows®, Linux®, Solaris®, Mac® OS, etc. The server 100 also runs a host OS 120 to manage system resources, such as physical central processing units (CPUs) 170, memory 190, I/O, and other hardware or software components. In one embodiment, the server 100 runs a hypervisor 125 to virtualize access to the underlying host hardware, making the use of the virtual machine 130 transparent to the user 192. The hypevisor 125 may also be known as a virtual machine monitor (VMM) or a kernel-based hypervisor. In some embodiments, the hypervisor 125 may be part of the host OS 120.

In one embodiment, the server 100 and the client 110 are coupled via a network 160, such as a wide area network (WAN), or other networks that are often subject to fluctuating traffic conditions. In alternative embodiments, the network 160 may include one or more of the following: a private network (e.g., a local area network (LAN), a WAN, intranet, etc.) or a public network (e.g., the Internet).

According to one embodiment of the present invention, the client 110 includes an input manager 112 to monitor network characteristics and to dynamically adjust the transmission of input events to the server 100 based on estimated network characteristics. The input manager 112 will be described in greater detail with reference to FIG. 3. The input events are generated by one or more input devices 113 of the client 110. The input devices 113 allow a user 192 to move a cursor and to select information (e.g., a portion of a displayed image) on a display 19. Examples of the input device 113 include a mouse, a joystick, a touch pad, a stylus, one or more buttons, a key pad, a combination of any of the above, etc. For example, the user 192 may use a mouse and a mouse button to move a cursor and to select a portion of text in a displayed document. The text selection can be transmitted to the server 100 as one or more input events that contain cursor position information and an indication of a text selection. In response, the application 142 on the server 100 processes the input events, and sends back response signals that may direct the client 110 to update the cursor on the display 119, highlight the selected text, change the shape of the cursor glyph, etc.

Figure 2:
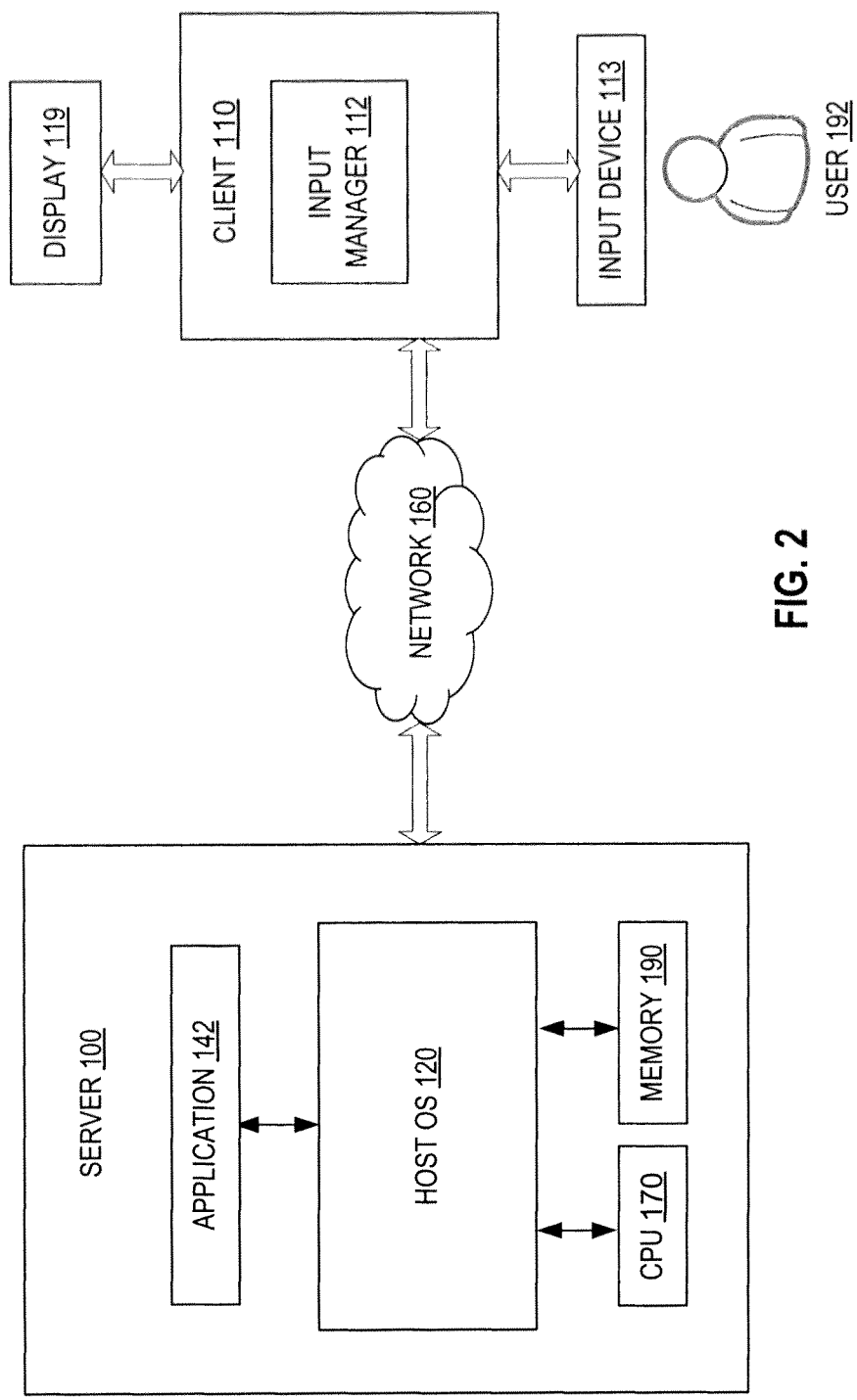
FIG. 2 is a block diagram of a network architecture in which another embodiment of the present invention may operate.

FIG. 2 is a block diagram that illustrates an alternative embodiment of a network architecture in which embodiments of the present invention may operate. The elements of FIG. 2 are the same or similar to the corresponding elements in FIG. 1, except that the application 142 is hosted directly by the server 100 instead of the virtual machine 130. That is, embodiments of the present invention can operate in both a virtualized environment (FIG. 1) and a non-virtualized environment (FIG. 2). In the embodiment of FIG. 2, the input manager 112 also monitors network characteristics and dynamically adjusts the transmission of input events to the server 100 based on estimated network characteristics.

Figure 3:
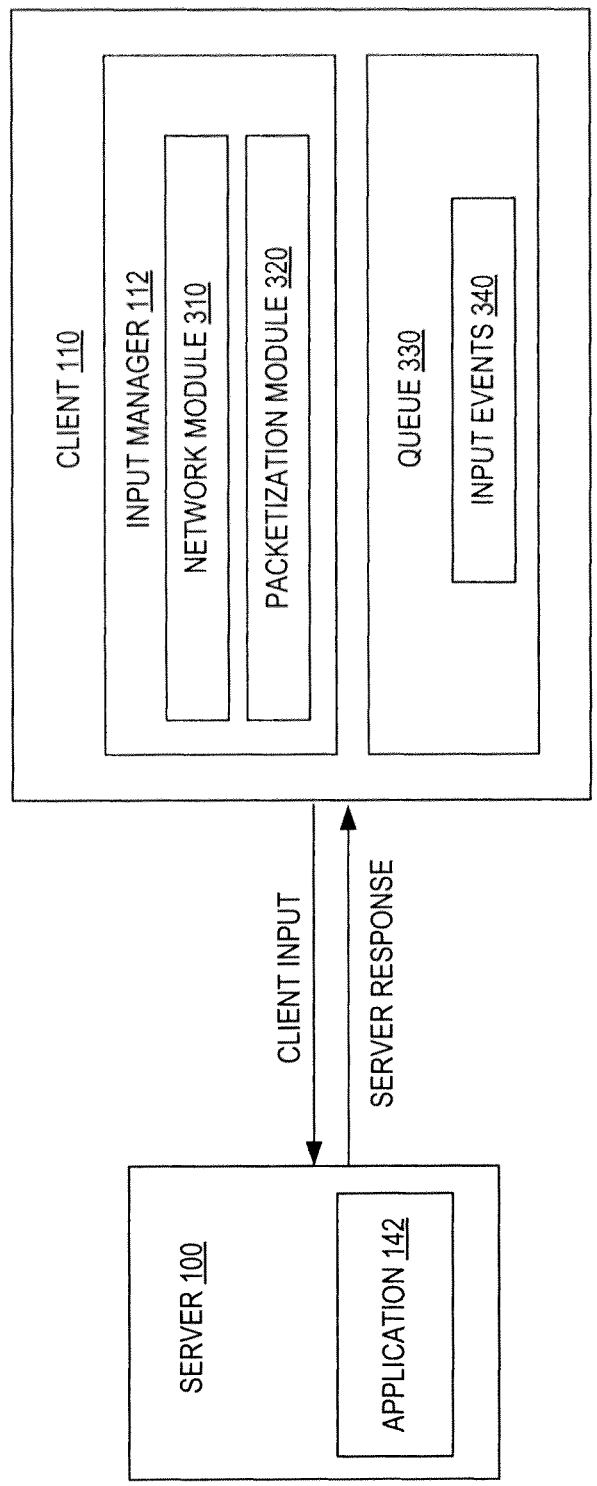
FIG. 3 illustrates an example of an interaction between a client and a remote desktop server.

FIG. 3 is a block diagram that illustrates details of the input manager 112 in the client 110. In one embodiment, the input manager 112 includes a network module 310 and a packetization module 320. The network module 310 is responsible for estimating the characteristics of the network 160 (e.g., latency, bandwidth, etc.). The estimated network characteristics are made available to the packetization module 320, which adjusts the transmission of input events to the server 100.

In one embodiment, the network module 310 sends the input events as a stream of transmission control protocol (TCP) packets. TCP has a built-in mechanism that allows a sender to estimate how much data can be effectively "in flight" from one end of a connection to the other. According to one embodiment, after the server 100 receives a predetermined number of TCP packets, the server 100 acknowledges with a response packet indicating that it has received the TCP packets. If the client 110 does not receive the response packet within a predetermined time period, the client 110 will infer that data has been lost in the network 160 and will retransmit the TCP packets to the server 100. From a single response packet, the network module 310 can estimate the round trip latency of the connection to the server 100. For example, round trip latency can be calculated as the duration of time from when a packet is sent by the client 110 to when a response for the packet is received by the client 110. One-way latency can be obtained by dividing the round trip latency by two. Additionally, from tracking multiple response packets, the network module 310 can estimate the connection bandwidth based on how many outgoing packets have been successfully received by the server 100 within a time period.

The network module 310 may estimate the network characteristics continuously from the response packets. The estimated network characteristics are made available to the packetization module 320. In one embodiment, the packetization module 320 uses the estimates to determine how many input events are to be batched into a single outgoing packet. In another embodiment, the packetization module 320 uses the estimates to determine whether each input event is to be sent or deleted, as well as how many of the non-deleted input events are to be batched into a single outgoing packet. Using the network module 310 and the packetization module 320, the client 110 is able to adjust its packet production rate based on the estimated network characteristics.

In one embodiment, the client 110 imposes a timeout threshold on how long an input event can stay unsent at the client 110, waiting to be batched and sent to the server 100. In one embodiment, the timeout threshold is determined based on a perceptual threshold above which latency becomes noticeable to humans. This perceptual threshold is typically in the range between 5 millisecond (ms) and 100 ms, depending on the type of image being perceived. Generally, most people can tolerate up to 100 ms for visual feedback for typical images displayed on a computer screen. Ideally, the client 110 will flush out input events to the network 160 regularly enough that responses can come back before that perceptual threshold is reached. However, in a network with limited bandwidth, so input events 340 can wait in a queue 330 for a while before they are batched for transmission to the server 100. In one embodiment, the client 110 may determine the timeout threshold from the estimated latency and the perceptual threshold. For example, if the round trip latency in the network is estimated to be 40 ms and the server 100 is infinitely fast, then there is 60 ms of time to batch up the input events. Since the server 100 is not infinitely fast and the network latency can fluctuate from time to time, a conservative timeout threshold may be set to be much less than the 60 ms (e.g., 40-50 ms) in the above example.

In one embodiment, an input event may contain a position or an encoded position of the cursor. The position may be an absolute position on the display coordinate or an encoded relative motion. Since most cursor motion is small, using the encoded relative motion can reduce the number of bytes to transmit over the network.

For example, modern displays often have a coordinate limit of 16 bits (65536 pixels) in each direction. Assume that each packet includes a 32-bit header. Thus, a packet containing one input event, in which the cursor position is recorded as a (16-bit, 16-bit) absolute position, has 64 bits in total. To reduce the number of bits, an input event in which the cursor moves by less than 127 pixels in each direction can be encoded as a (8-bit, 8-bit) relative motion. The total number of bits in such a packet is 48 bits. Further reduction on the number of bits can be achieved. For example, if a relative motion is within a "delta" field of +/−7 pixels in each direction, the relative motion can be recorded as a (4-bit, 4-bit) pair and the total number of bits in the packet becomes 40 bits in total.

In one embodiment, some input events may include a selection state (e.g., indication of whether a mouse button is pressed) associated with a portion of a displayed image. A selection state may be packed with cursor position information as one input event, or may be packed by itself as an input event.

In one embodiment, the packetization module 320 may delete (also known as "squash") some of the input events generated by the client's input devices. For example, the packetization module 320 may delete one or more input events that are generated when both of the following conditions are true: a) the client 110 is not receiving acknowledgments from the server 100 in a timely fashion, e.g., when the estimated round trip latency is longer than a predetermined multiple of (illustratively, 10 times) the expected round trip time (RTT); and b) the input events do not have an active selection state (e.g., no mouse buttons have been pressed), which means that nothing interactive is likely being performed where accuracy matters.

When condition (a) is true, it is likely that the network is undergoing a transient problem. When condition (b) is true, a user of the client 110 is probably not actively painting anything, or doing a drag-and-drop operation, etc. It is likely that the user expects the server 100 to only use cursor position information for updating the cursor location on the display. When the network is stalled (as indicated in condition (a)), and the input device does not appear to be doing anything besides moving (as indicated in condition (b)), the corresponding input event can likely be deleted without negatively affecting the visual effect and user experience. Thus, the client 110 may choose to delete input events when both condition (a) and condition (b) are true, and stop sending any packet until the network recovers from the transient problem. When the network recovers, the client 110 will start sending current input events as well as those past queued input events that do not meet the above two conditions. As a result, the client 110 will be able to catch up quickly since many of the past input events have been deleted without needing to be transmitted to the server 100.

Accordingly, based on the estimated network characteristics, the client 110 is able to determine when to delete some of the input events, and how many input events are to be batched into a single outgoing packet. Batching a greater number of input events in a single packet reduces packet overhead but increases the delay in receiving a response from the server 100. In one embodiment, the client 110 may batch input events when a low-bandwidth connection between the client 110 and the server 100 is detected (e.g., by detecting that the network 160 includes a WAN). In one embodiment, the client 110 may batch input events when the bandwidth is below a predetermined threshold and/or the network latency is above a predetermined threshold. When the client 110 batches input events, the number of input events per packet may be dynamically determined to optimize network bandwidth and server response delay.

Figure 4:
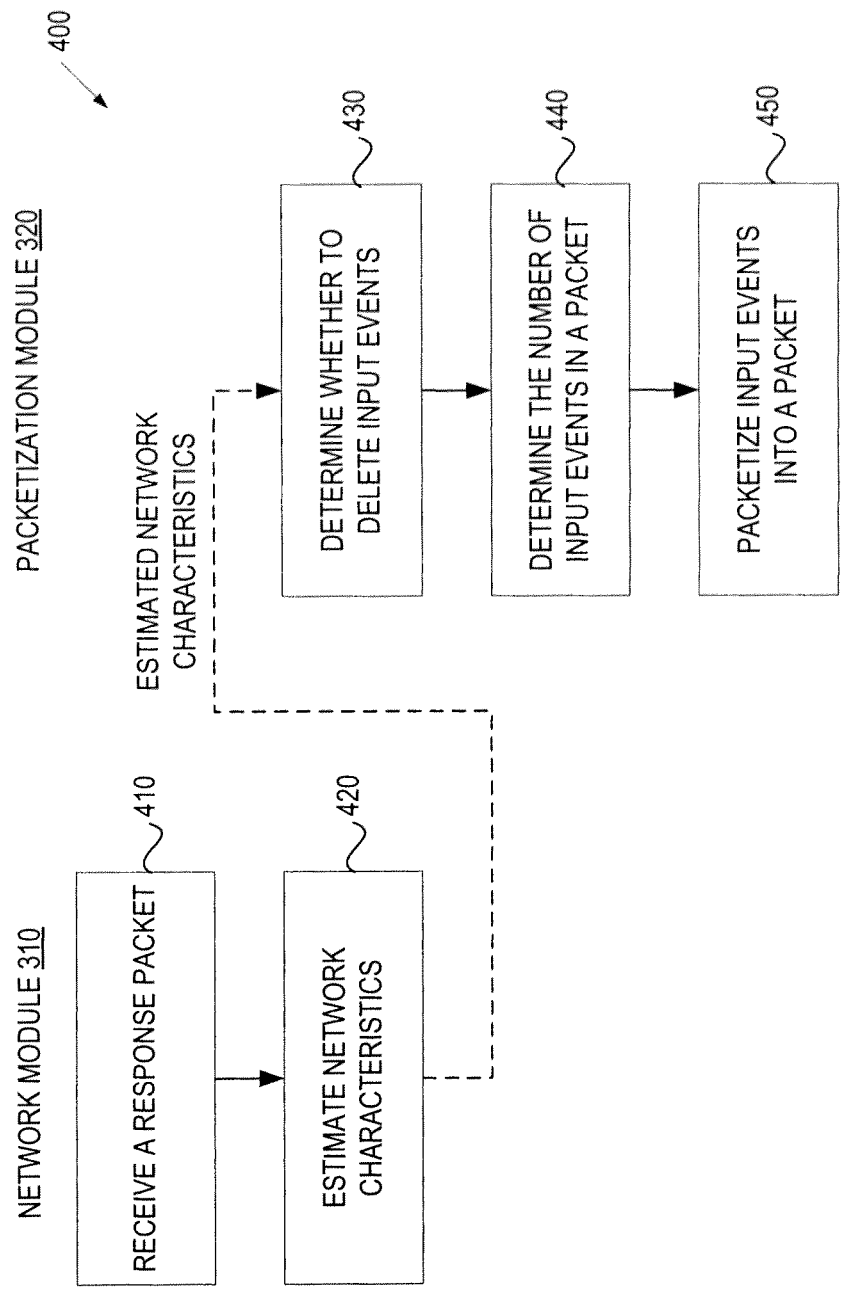
FIG. 4 is a flow diagram of one embodiment of a method for managing the transmission of input events from a client to a remote desktop server over a network.

FIG. 4 is a flow diagram illustrating one embodiment of a method 400 for managing the transmission of input events from a client to a remote desktop server over a network. The method 400 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 400 is performed by the input manager 112 of FIG. 3, which is located in the client 110 coupled to the server 100 of FIG. 1 or FIG. 2 over the network 160.

Referring to FIG. 4, in one embodiment, the method 400 begins when the network module 310 of the input manager 112 receives a response packet from the server 100 (block 410). The response packet acknowledges receipt of one or more packets from the client 110. Based on the timing of and information in the response packet, the network module 310 estimates the current network characteristics (e.g., bandwidth, latency, etc.) (block 420). The estimated network characteristics are made available to the packetization module 320 (where the information flow is shown as a dotted line). Based on the estimated network characteristics and the information carried in each input event, packetization module 320 determines whether to delete some of the input events in the queue 330 (without transmitting them to the server 100) (block 430). In one embodiment, the operation of block 430 may be turned on/off by a user or a system administrator, who can enable or disable the state of a configurable setting in the input manager 112. Based on the estimated network characteristics, the packetization module 320 also determines the number of input events to be batched in a single outgoing packet (block 440). The packetization module 320 then packetizes the determined number of input events into a single outgoing packet (block 450), and the client 110 transmits the packet to the server 100. In one embodiment, after a number of packets are transmitted to the server 100, the server 100 sends back a response packet to the client 110, acknowledging the packets that are received by the server 100. The method 400 then repeats from block 410.

Figure 5:
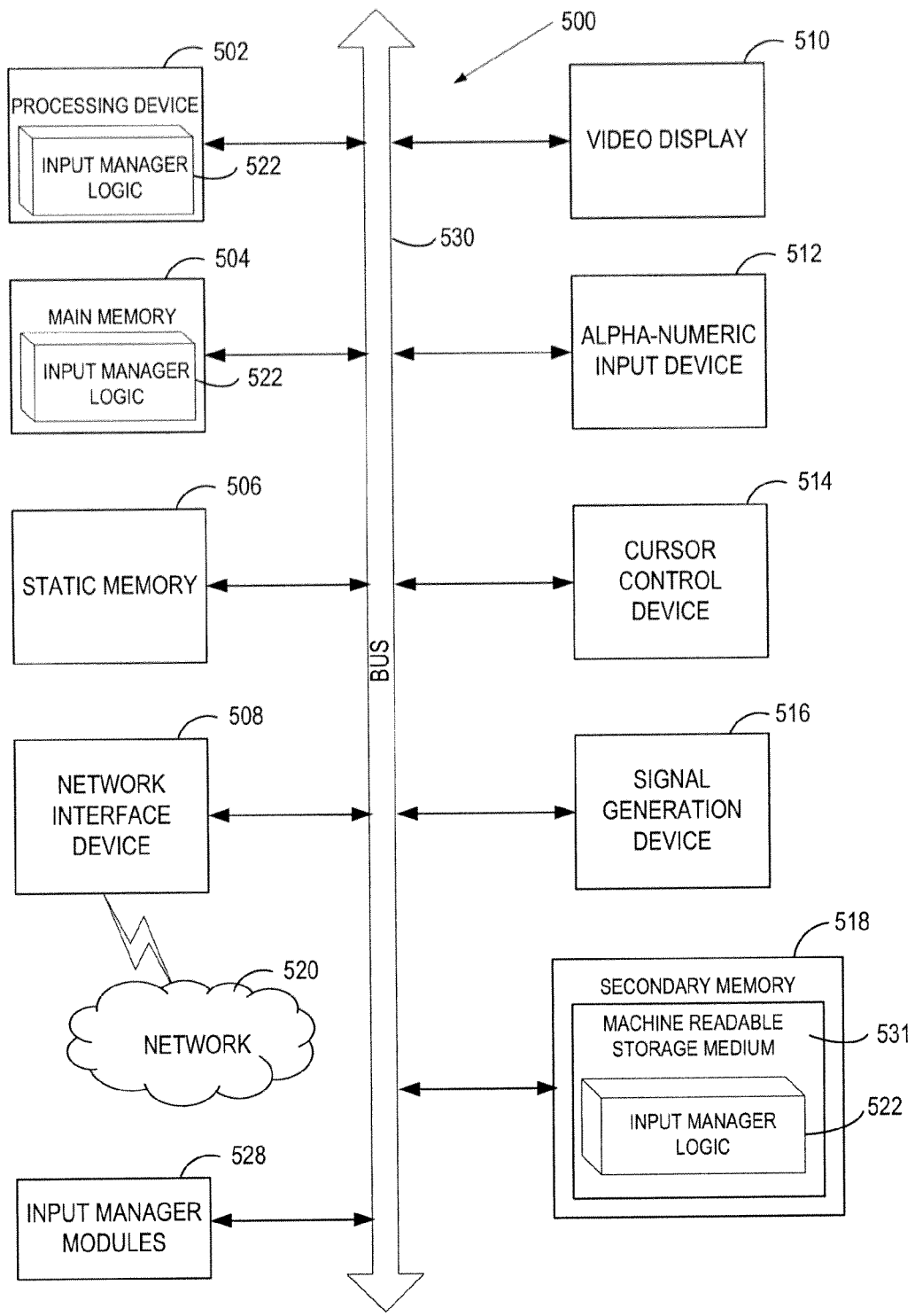
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal compute (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute input manager logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., input manager logic 522) embodying any one or more of the methodologies or functions described herein (e.g., the input manager 128 of FIG. 3). The input manager logic 522 may also reside, completely or at least partially, within the main memory 504 and/or within the processing device 502 during execution thereof by the computer system 500; the main memory 504 and the processing device 502 also constituting machine-readable storage media. The input manager logic 522 may further be transmitted or received over a network 520 via the network interface device 508.

The machine-readable storage medium 531 may also be used to store the input manager logic 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 500 may additionally include input manager modules 528 for implementing the functionalities of the input manager 128 of FIG. 3. The module 528, components and other features described herein (for example in relation to FIG. 1 and FIG. 2) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "generating", "estimating", "adjusting", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   generating, by a processing device, a stream of input events that contain position information of a cursor shown on a display;

estimating, by the processing device, a connection condition of a network that couples the processing device to a remote server; and in view of the estimated connection condition, adjusting a quantity of the input events batched into a packet to be sent from the processing device to the remote server over the network, wherein the packet is sent to a remote desktop application on the remote server to process the input events.

2. The method of claim 1, further comprising:

determining, by the processing device, whether to send or delete an input event in view of the estimation and information contained in the input event.

3. The method of claim 2, wherein the information contained in the input event comprises:

an indication showing whether or not a portion of a displayed image has been selected.

4. The method of claim 1, wherein estimating the connection condition of a network further comprises:

estimating, by the processing device, network latency from a response packet sent from the server.

5. The method of claim 1, wherein estimating the connection condition of a network further comprises:

estimating, by the processing device, network bandwidth from a plurality of response packets sent from the server.

6. The method of claim 1, further comprising:

imposing, by the processing device, a timeout threshold on a length of time an input event stays unsent at the processing device, the timeout threshold determined in view of a perceptual threshold above which latency is noticeable to humans.

7. A system comprising:

a hardware input device to generate input events that contain position information of the cursor; and a processing device coupled to the hardware input device, the processing device to estimate a connection condition of a network that couples the processing device to a remote server, and to adjust a number of the input events batched into a packet to be sent from the processing device to the remote server over the network in view of the estimation of the connection condition, wherein the packet is sent to a remote desktop application on the remote server to process the input events.

8. The system of claim 7, wherein the processing device further comprises:

an input manager to determine whether to send or delete an input event in view of the estimation and information contained in the input event.

9. The system of claim 8, wherein the information contained in the input event comprises an indication showing whether or not a portion of a displayed image has been selected.

10. The system of claim 7, wherein the processing device further comprises:

a network module to estimate network latency from a response packet sent from the remote server.

11. The system of claim 7, wherein the processing device further comprises:

a network module to estimate network bandwidth from a plurality of response packets sent from the remote server.

12. The system of claim 7, wherein the processing device imposes a timeout threshold on a length of time an input event stays unsent at the processing device, the timeout threshold determined in view of a perceptual threshold above which latency is noticeable to humans.

13. A non-transitory computer readable storage medium having instructions that, when executed by a processing device, cause the processing device to:

generate, by the processing device, a stream of input events that contain position information of a cursor shown on a display of the processing device;

estimate, by the processing device, a connection condition of a network that couples the processing device to a remote server; and in view of estimation of the connection condition, adjust, by the processing device, a number of the input events batched into a packet that is sent from the processing device to the remote server over the network, wherein the packet is sent to a remote desktop application on the server to process the input events.

14. The computer readable storage medium of claim 13, wherein the processing device is further to:

determine, by the processing device, whether to send or delete an input event in view of the estimation and information contained in the input event.

15. The computer readable storage medium of claim 14, wherein the information contained in the input event comprises an indication showing whether or not a portion of a displayed image has been selected.

16. The computer readable storage medium of claim 13, wherein to estimate the connection condition of a network further comprises:

estimating, by the processing device, network latency from a response packet sent from the remote server.

17. The computer readable storage medium of claim 13, wherein to estimate the connection condition of a network further comprises:

estimating, by the processing device, network bandwidth from a plurality of response packets sent from the remote server.

18. The computer readable storage medium of claim 13, wherein the processing device is further to:

impose, by the processing device, a timeout threshold on a length of time an input event stays unsent at the processing device, the timeout threshold determined in view of a perceptual threshold above which latency is noticeable to humans.

* * * * *